United States Patent [19]

Kameda

[11] Patent Number: 5,050,527
[45] Date of Patent: Sep. 24, 1991

[54] AUTOMOTIVE METER WITH ILLUMINATOR

[75] Inventor: Tsuyoshi Kameda, Saitama, Japan

[73] Assignee: Kanto Seiki Co., Ltd., Omiya, Japan

[21] Appl. No.: 407,312

[22] Filed: Sep. 14, 1989

[30] Foreign Application Priority Data

Sep. 19, 1988 [JP] Japan ............... 63-122609[U]

[51] Int. Cl.$^5$ ............................................. G01D 13/20
[52] U.S. Cl. ........................... 116/334; 116/DIG. 36; 250/461.1
[58] Field of Search ............... 40/543, 542; 116/62.1, 116/62.2, 286–288, 295, 335, 334, DIG. 35, DIG. 36; 250/463.1, 461.1; 362/84, 34; 368/226, 227

[56] References Cited

U.S. PATENT DOCUMENTS

| | | | |
|---|---|---|---|
| 2,341,583 | 2/1944 | Tuve | 40/542 |
| 2,428,792 | 10/1947 | Evans | 116/286 |
| 4,424,449 | 1/1984 | O'Brill | 250/461.1 |
| 4,536,656 | 8/1985 | Sowa | 250/463.1 |
| 4,561,042 | 12/1985 | Wehner et al. | 362/30 |

Primary Examiner—William A. Cuchlinski, Jr.
Assistant Examiner—W. Morris Worth
Attorney, Agent, or Firm—Foley & Lardner

[57] ABSTRACT

Herein disclosed is an automotive meter which comprises an opaque base plate constructed of one of natural wood and natural stone; graduations provided on a front face of the base plate, the graduations containing a fluorescent material; and an ultraviolet lamp located in front of the base plate.

2 Claims, 1 Drawing Sheet

AUTOMOTIVE METER WITH ILLUMINATOR

BACKGROUND OF THE INVENTION

1. Field of the Invention

The present invention relates in general to an automotive meter, such as speedometer, tachometer or the like, and more particularly, to automotive meters of a type which is equipped with a dial board illuminating device.

2. Description of the Prior Art

In order to clarify the present invention, two conventional automotive speedometers of the above-mentioned type are described with reference to the accompanying drawings.

In FIG. 2, there is shown one conventional speedometer of a so-called "back lamp" type. The meter comprises a transparent base plate 1 constructed of acrylate resin or the like, an opaque film 3 attached to a front surface of the base plate 1 and an electric lamp 4 positioned behind the base plate 1. The opaque film 3 has graduations 2 cut out therefrom. The base plate 1 and the graduated opaque film 3 thus constitute a so-called "dial board". Although not shown in the drawing, a pointer is arranged in front of the dial board. Upon energization, the lamp 4 produces visible light rays which pass through the cut out graduations 2 from the back of the base plate 1. With this, the graduations are clearly viewed from the front of the meter particularly in surroundings which receive little light.

In FIG. 3, there is shown another conventional speedometer of the so-called "front lamp" type. The meter comprises an opaque base plate 5 and an electric lamp 4 positioned in front of the base plate 5. Graduations 6 are printed on a front surface of the base plate 5 using colored paint, colored ink or the like. The base plate 5 thus graduated serves as a dial board. Upon energization, the lamp 4 produces visible light rays and, thus, illuminates the graduated front surface of the dial board. Thus, the graduations are easily read by a viewer even in dark surroundings.

However, due to usage of the lamp 4 which emits visible light rays, the above-mentioned conventional speedometers fail to provide the graduations of the dial board with an elegant illumination. Furthermore, due to the nature of the lamp 4 used, uneven illumination tends to occur on the graduated face of the dial board. That is, the graduations located near the lamp 4 are highly illuminated, while the graduations located remotely from the lamp 4 are poorly illuminated.

SUMMARY OF THE INVENTION

It is therefore an object of the present invention to provide an automotive meter which is free of the above-mentioned drawbacks.

According to the present invention, there is provided an automotive meter whose dial board is constructed of a natural wood or a natural stone to assure elegancy of appearance of the meter, particularly in daytime.

According to the present invention, there is further provided an automotive meter whose graduations are made of a fluorescent material and thus emit elegant visible light when receiving ultraviolet rays.

According to the present invention, there is provided an automotive meter which comprises an opaque base plate constructed of one of natural wood and natural stone; graduations provided on a front face of the base plate, the graduations containing a fluorescent material; and an ultraviolet lamp located in front of the base plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
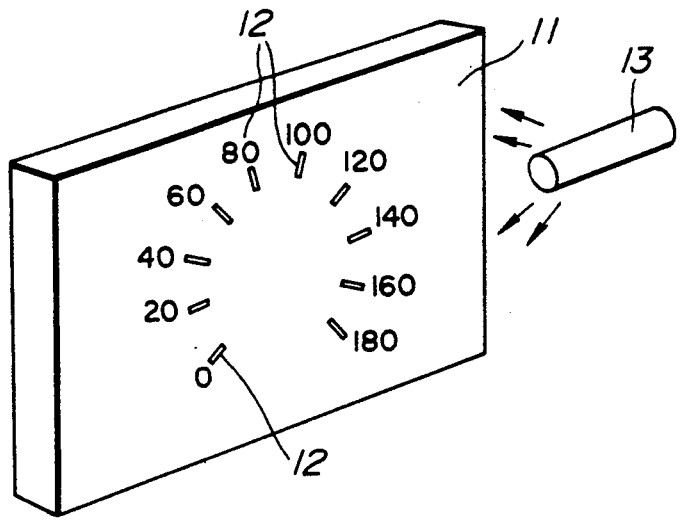
FIG. 1 is a schematically illustrated perspective view of an automotive speedometer of the present invention, with a pointer removed.
Figure 2:
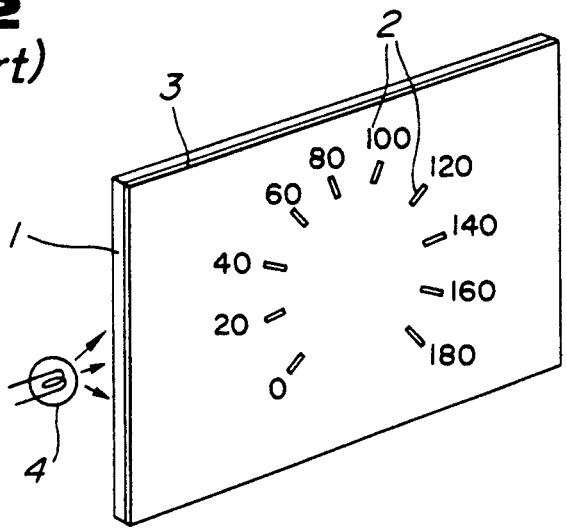
FIG. 2 is a view similar to FIG. 1, but showing a first conventional speedometer.
Figure 3:
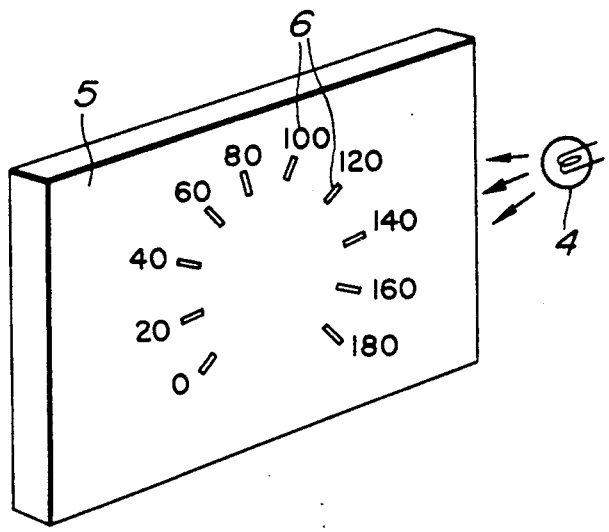
FIG. 3 is a view also similar to FIG. 1, but showing a second conventional speedometer.

Referring to FIGS. 1, there is shown schematically an automotive speedometer according to the present invention.

The meter comprises an opaque base plate 11 constructed of a natural wood or a natural stone, and an ultraviolet electric lamp 13 positioned in front of the base plate 11. Graduations 12 are printed directly on a front surface of the base plate 11 using a paint which contains a fluorescent material. Thus, the base plate 11 thus graduated serves as a dial board. As is known, the fluoresent material emits elegant visible light when receiving ultraviolet rays. Although not shown in the drawing, a pointer is arranged in front of the dial board.

When, for example at night, the ultraviolet lamp 13 is energized, ultraviolet rays are emitted from the lamp 13, and thus, the graduations 12 of the fluorescent material are excited to emit visible light. Because the light produced by the fluorescent material has an elegant and unique brightness and color, the graduations 12 are easily distinguished from the darkened other face part of the dial board. Due to the nature of the ultraviolet rays, they are equally received by the fluorescent material, and thus, even illumination of the graduations 12 is achieved in the invention.

In the daytime with the ultraviolet lamp 13 kept deenergized, the dial board is illuminated by natural light. Thus, the external appearance of the natural wood or stone of the dial board is stressed assuring the elegancy of the same.

What is claimed is:

1. An automotive meter dial board display comprising an opaque base plate constructed of decorative natural wood; and graduations for cooperating with an automotive meter pointer, said graduations being printed directly on a front face of said base plate without any bonding material interposed therebetween, said graduations being made of a paint which contains a fluorescent material and responds to radiation from an ultraviolet lamp positioned in front of said base plate.

2. An automotive meter dial board display comprising an opaque base plate constructed of natural stone; and graduations for cooperating with an automotive meter pointer, said graduations being printed directly on a front face of said base plate without any bonding material interposed therebetween, said graduations being made of a paint which contains a fluorescent material and responds to radiation from an ultraviolet lamp positioned in front of said base plate.

* * * * *